No. 633,153. Patented Sept. 19, 1899.
W. W. PHILBRICK.
MATCHER HEAD.
(Application filed Apr. 8, 1899.)
(No Model.) 3 Sheets—Sheet 1.
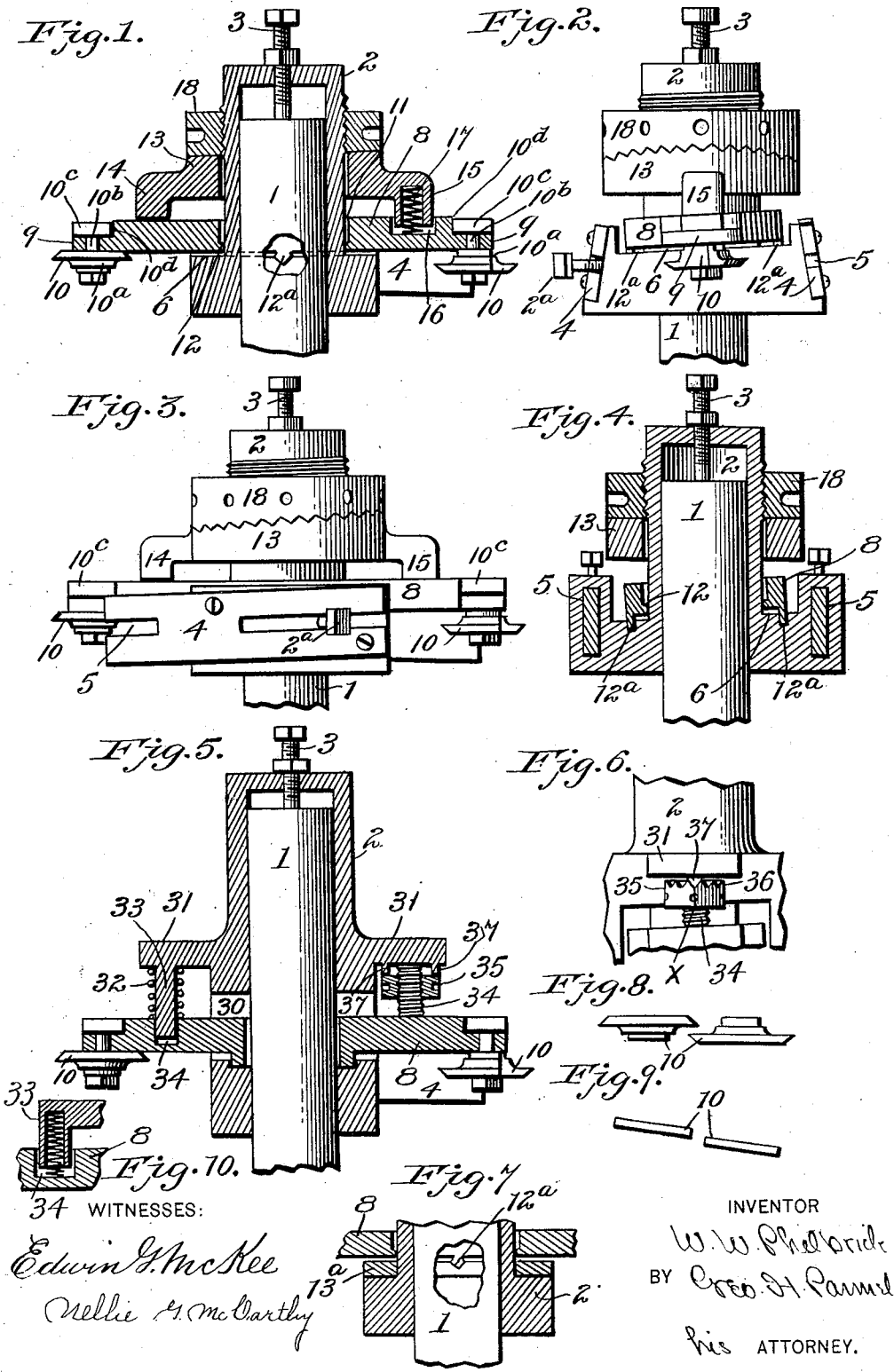
WITNESSES:
Edwin H. McKee
Nellie M. McCarthy
INVENTOR
W. W. Philbrick
BY Geo. H. Parmelee
his ATTORNEY.

No. 633,153. Patented Sept. 19, 1899.
W. W. PHILBRICK.
MATCHER HEAD.
(Application filed Apr. 8, 1899.)
(No Model.) 3 Sheets—Sheet 2.
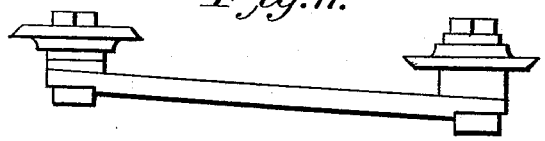
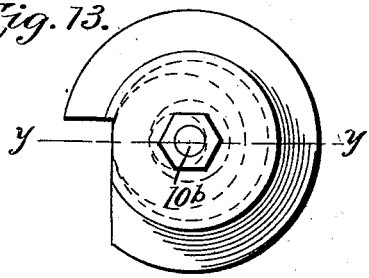
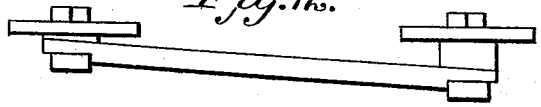
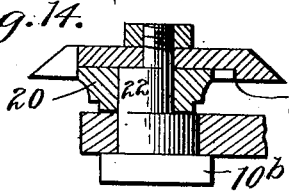
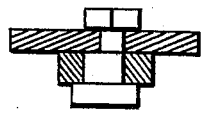
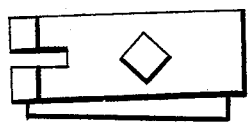
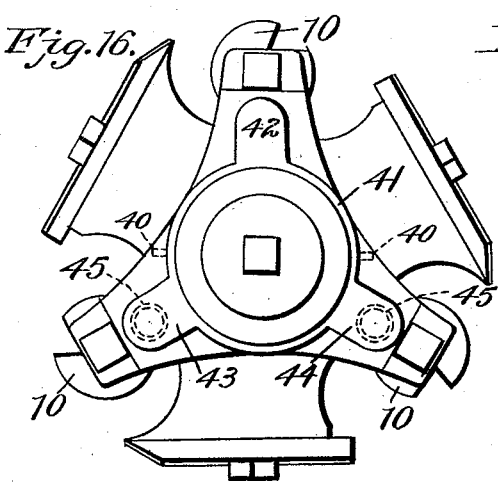
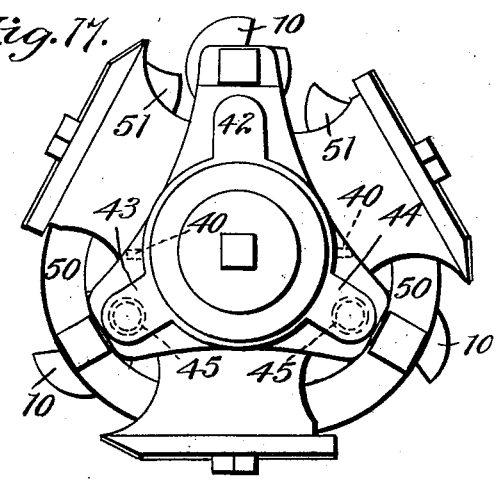
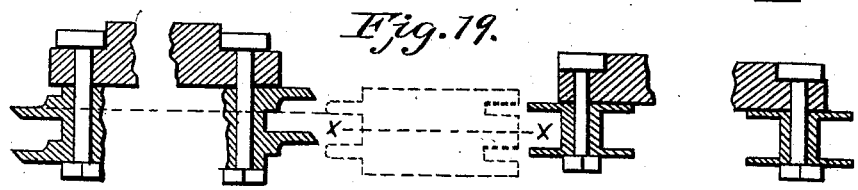
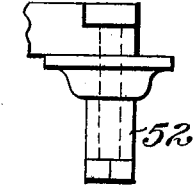
WITNESSES:
INVENTOR
W. W. Philbrick
BY Geo. H. Parmelee
his ATTORNEY
THE NORRIS PETERS CO., PHOTO-LITHO., WASHINGTON, D. C.

No. 633,153. Patented Sept. 19, 1899.
W. W. PHILBRICK.
MATCHER HEAD.
(Application filed Apr. 8, 1899.)
(No Model.) 3 Sheets—Sheet 3.
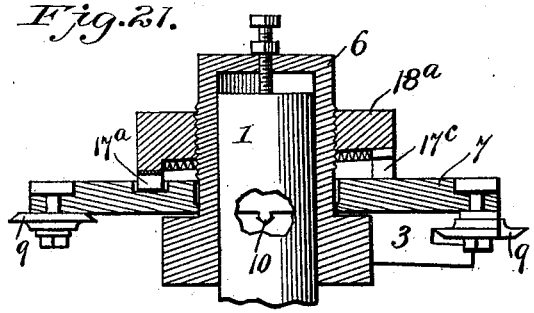
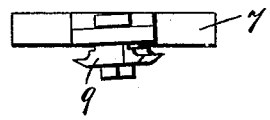
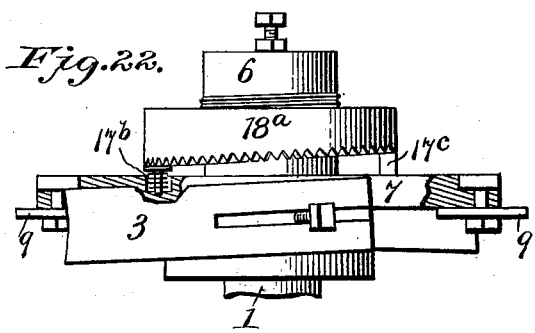
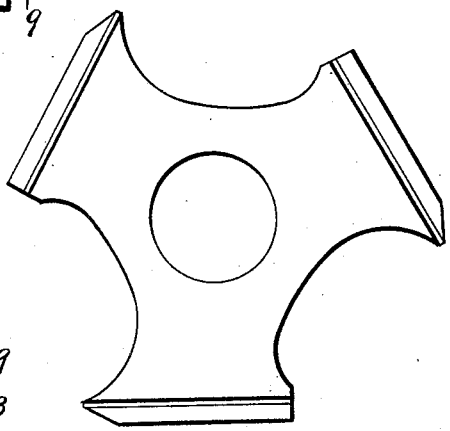
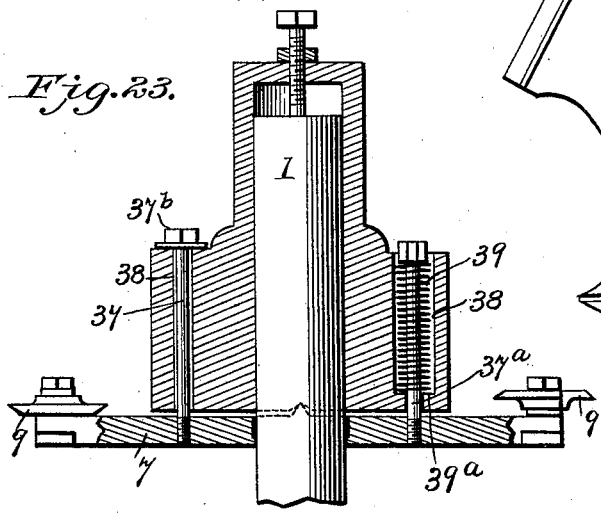
WITNESSES:
Edwin G. McKee.
Nellie G. McCarthy.
INVENTOR
W. W. Philbrick
BY Geo. H. Parmelee
his ATTORNEY.
THE NORRIS PETERS CO., PHOTO-LITHO., WASHINGTON, D. C.

UNITED STATES PATENT OFFICE.

WARREN W. PHILBRICK, OF SEATTLE, WASHINGTON.

MATCHER-HEAD.

SPECIFICATION forming part of Letters Patent No. 633,153, dated September 19, 1899.

Application filed April 8, 1899. Serial No. 712,291. (No model.)

*To all whom it may concern:*

Be it known that I, WARREN W. PHILBRICK, residing at Seattle, in the county of King and State of Washington, have invented certain new and useful Improvements in Matcher-Heads; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention has relation to certain new and useful improvements in matcher-heads used in tonguing, grooving, rabbeting, or otherwise jointing the edges of lumber, and more particularly to that class of such heads as have been described and claimed by me in former applications, wherein the work of jointing the vertical portions of the jointed face of the edges of the lumber is performed by means of jointing-cutters, while the work of forming the tongue, groove, or other desired conformation of said edges is performed by bits positioned upon the head at intermediate points with respect to the jointing-cutters.

The present invention is more particularly designed to provide means of novel and effective character for adjusting the carrier, upon which the intermediately-positioned bits are mounted for the purpose of forming tongues of different thickness and grooves of different widths; also, to provide certain means of novel character, whereby said bits may be adjusted to cut tongues of different lengths or projection or grooves of different depths, while maintaining their relative positions with respect to the jointing-cutters; also, to provide for certain kinds of work a novel arrangement of the bits and cutters.

My improvements are in the main adapted to both tonguing and grooving heads.

With the above-named objects in view and certain other minor features of improvement hereinafter specified my invention consists in the novel construction and combination of parts, all as hereinafter described, and pointed out in the appended claims.

In the accompanying drawings, Figure 1 is a central vertical section of a matcher-head embodying my invention. Fig. 2 is a side elevation of the same. Fig. 3 is a side elevation with the head rotated ninety degrees from the position in which it is shown in Fig. 2. Fig. 4 is a vertical section in a plane at right angles to the section in Fig. 1 and showing a different seating of the jointing-blades. Fig. 5 is a vertical section showing a modified construction. Fig. 6 is a detail view showing the adjusting device of the head of Fig. 4. Fig. 7 is a detail view showing the use of a collar to raise the bit-carrier. Fig. 8 is a view showing conventionally the arrangement of the circular bits on a tonguing-head. Fig. 9 is a similar view showing the arrangement of the circular bits on a grooving-head. Fig. 10 is a fragmentary view of a modified arrangement of the spring. Fig. 11 is a side elevation showing a different mode of seating the tonguing-bits. Fig. 12 is a similar view showing a different mode of seating the grooving-bits. Fig. 13 is a plan view of another construction of bits. Fig. 14 is a section on line $y\ y$, Fig. 13. Fig. 15 is a section showing a third form of adjustable bit. Fig. 16 is a plan view of a three-winged head. Fig. 17 is similar view of a modified form of three-winged head. Fig. 18 is a detail veiw showing the preferred position and form of one of the jointing-blades on a three-winged head. Figs. 19 and 20 are detail views showing the bits arranged for special work. Fig. 21 is a vertical section of a head, showing another means for adjusting the bit-carrying bar. Fig. 22 is a side view of the same. Fig. 23 is a vertical section of a head having the bit-carrying bar seated on the under side. Fig. 24 is a detail view showing how the circular bits may be seated on the carrying-bar to give side clearance. Fig. 25 is a plan view of the bit-carrying bar for a three-winged head.

Referring to the drawings, the numeral 1 designates a rotary spindle upon which the head is mounted.

2 designates the head, secured to said spindle by a screw $2^a$ and vertically adjustable thereon by means of a screw 3.

4 designates the jointing blades or cutters, which are secured in slots 5 in the sides or wings of the head, as shown in Fig. 4, or which are secured to exterior seats on said wings, as shown in Fig. 2, according to the character of the particular head. For the tonguing-head these blades or cutters are slotted or cut away at 5 to pass the tongue formed on the lumber by the intermediately-positioned bits.

6 is a seat extending diametrically across the top face of the body of the head around its hub or boss 7 and between the blades or cutters 4. 8 is a bit-carrier consisting of a bar placed in said seat, with projecting end portions formed with apertured seats 9 for the bits 10. Said bar has a central aperture 11, which fits loosely around the hub or boss 7 and which is counterbored at 12 and rests upon fulcrum-points $12^a$ to permit said bar to have a limited rocking movement in a vertical plane upon said hub or boss.

13 designates a vertically-movable collar which is placed on the hub or boss 7 above the bit-carrier and which is formed with opposite laterally and downwardly projecting lugs 14 and 15. The lug 14 bears directly upon the upper face of the bit-carrier, while the lug 15, which is hollow, enters to a greater or less extent a recess 16 in the upper face of said bar.

17 is a spring (either coil or rubber) which is seated in the hollow lug 15, with its upper end bearing against the upper wall of the cavity in said lug and its lower end seated on the bottom wall of the recess 16.

18 is an adjusting-nut threaded on hub or boss 7 and bearing on the upper face of the collar 13, said collar and nut preferably having serrated engaging faces which may be marked to indicate the degree of adjustment. In Figs. 21 and 22 I have shown a construction wherein the collar 13 is omitted and a serrated nut $18^a$ is made to act directly upon the bit-carrier in the same manner as do the lugs 14 and $15^a$ of the collar 13. In Fig. 21 I have shown a curved plate-spring $17^a$ interposed between the nut and said carrier, while in Fig. 22 I have shown a coiled spring $17^b$. The opposite end portion of the carrier has a tooth $17^c$, which engages the teeth or serrations of the nut.

The bits or cutters 10 are secured to the bit-seats 9 upon the under side of the end portions of the bar and the tonguing-bits and formed with bosses or shouldered portions $10^a$ and are seated in reversed positions, as shown in Figs. 1, 3, 5, and 8, so that when the bit-carrying bar is in horizontal position the cutting edges of the two bits will be separated vertically from each other by a distance equal to the thickest tongue which it is practicable to make with the bits. By adjusting the nut 18 so as to depress the upper cutting-bit and raise the under cutting-bit, the cutting edges of the said bits being thereby brought nearer together, a thinner tongue will result. In a grooving-head, however, when the bar is in horizontal position the two bits, which are of flat form, being in the same horizontal plane form a groove of minimum width, and by a similar adjustment of the bit-carrying bar to that above described said bits are separated, and a wider groove results. I may, however, seat the tonguing-bits as shown in Fig. 11 and the grooving-bits as shown in Fig. 12. In this case the two bits are in the same horizontal plane when the bit-carrying bar has its greatest pitch, and their cutting edges are in position to form a maximum tongue; and as said bar is adjusted toward a horizontal position the cutting edges are brought nearer together or toward a common horizontal plane, and a thinner tongue results, the bits taking proper point clearance. Grooving-bits seated as in Fig. 12 form a minimum groove when the bit-carrying bar is in horizontal position and cut a gradually wider groove as said bar is adjusted to a more nearly level position, taking proper point clearance in different adjustments. The head being secured to the spindle by the screw $2^a$, it will readily be seen that it is not necessary to disturb its adjustment in order to adjust the bits and cutters, either for expansion or to take up wear. For work where the tongue or groove or the rabbet, as in rabbeting ship-lap, is to be formed nearer one face of the lumber than the other the bit-carrier can be raised to the desired extent by placing a collar $13^a$ underneath it on the head.

The bits 10 are shown as secured to the carrier by means of bolts $10^b$, whose square heads $10^c$ engage shoulders $10^d$ on the bit-carrier, whereby said bolts are held against rotation. Said bits are preferably formed with beveled peripheral edges, as shown. For the purpose of adjusting said bits to vary the length of the tongues or the depths of the grooves which they form without changing their relation to the jointing-cutters they may be conveniently formed in two parts, as shown in Figs. 13 and 14—that is to say, with a separate adjusting portion 20 partially seated in a cavity 21 in the face of the body or cutting portion of the bit. This portion 20 is of circular form, as shown in Fig. 13, and is seated on an eccentric portion 22 of the securing-bolt $10^b$. It will be seen that a rotation of the said bolt will act upon said portion 20 to advance or retract the cutting edge of the body portion of the bit. A similar result may be obtained by seating a one-piece bit on an eccentric portion of the bolt, as shown in Fig. 15. The sides of the heads of the bolts may be correspondingly marked or numbered to indicate when both bits have a similar adjustment.

In Fig. 5 I have shown a modification adapted to a head wherein the bit-carrier is seated in a diametrical slot or opening 30 of the head instead of on the upper portion of the head. In this construction the head is formed above the slot or opening 30 with projecting lugs 31, which correspond to the lugs 14 and 15 on the collar 13 above described. Seated between one of said lugs and the bit-carrier is a spring 32. This spring may be inclosed in a hollow stud 33, secured in one of the lugs 31, as in Fig. 10, or it may be coiled around said stud, as in Fig. 5, its lower end being seated in both cases in a cavity 34 in the upper face of said bar and into which the stud 33 enters to a greater or less extent. The opposite end of the bit-carrier underneath the other lug 31 is provided with a screw-stud 34, on which is seated a nut 35, having a toothed or serrated upper face 36, which engages the adjacent under face of the said lug 31, which has teeth or projections 37 in line with the axis of the bit-carrier to engage said face. This nut has an indication-mark at $x$ to indicate when the bit-carrier is level, and a single turn of the nut 35 to right or left will be sufficient to give the bit-carrier the widest degree of its adjustment, said carrier being mounted to rock or tilt in a vertical plane in the same manner as when mounted on the top portion of the head. The screw-stud being a short one, the pitch of the bar in different adjustments with respect to a horizontal position only throws said stud very slightly out of perpendicular. In either position of the bit-carrier above described the seat upon which it rests may be inclined slightly in a direction at right angles to the axial line of the carrier in order to give the bits mounted thereon side clearance, and said bits may also be given point clearance in the manner shown in Figs. 11 and 12.

In Fig. 23 I have shown the bit-carrying bar seated underneath the head. Bolts 37 37$^a$ pass loosely through vertical apertures 38 in the head and are tapped into said bar upon opposite sides of its fulcrum-points. Bolt 37 has a flanged head 37$^b$. Bolt 37$^a$ has a coiled spring 39 seated between its head and a seat 39$^a$ in the head, the tendency of this spring being to pull the bolt 37$^a$ and the corresponding end of the bit-carrying bar upwardly, and consequently depress the opposite end of said bar to the extent permitted by the head 37$^b$ of the bolt 37. By turning said bolt 37 to seat it to a greater or less extent in the bit-carrying bar the pitch of the latter is decreased or diminished.

In Fig. 16 I have shown the invention applied to a three-winged head. The bit-carrier is seated on the upper portion of the head around its hub to rock on the opposite fulcrum-points 40. It has three wings, upon each of which a bit is mounted. 41 designates a collar corresponding to the collar 13 above described and which has three lugs 42, 43, and 44. The lug 42 bears directly upon one wing of the bit-carrier in the same manner as lug 14 of the two-winged head, and springs 45 are interposed between the lugs 43 and 44 and the other two wings. Two of the circular bits operate upon the bottom of the tongue or groove and the third upon the top of the same. In this form of head I have shown the jointing bits or cutters as having straight cutting edges and seated in inclined position, with their upper edges nearer the axes of the head than their lower edges and with their rear ends elevated. By seating the bits in this manner they are caused to make a practically square shearing cut from the surface of the board to the tongue or groove, the slight undercut really made not being noticeable in practice. Fig. 17 shows a similar head, except that but one of the circular bits—the one making the upper cut—is seated on the bit-carrier, the other two being seated on the head proper on bridge portions 50 thereof. To balance these bridge portions 50, the opposite sides of the head are formed with the weight projections or lugs 51. These forms of head having the jointing-cutters set or pitched and inclined, as described, are especially designed for use for single-matching work—that is to say, where the joint is to show from one side only, as in ordinary flooring. A slight undercut in this case is an advantage rather than otherwise, as it insures a close joint at the top surface.

Fig. 19 shows the arrangement of the bits for matching double ceiling (indicated in dotted lines) and which is afterward resawed on the line $x\ x$. Fig. 20 shows an arrangement of these bits for use in molding work, such as shown in the dotted lines. In this case the bar is formed at the end having the lighter bit with a weighted portion 52 to balance the other bit and to insure substantially the same mass of metal revolving in the same plane.

In all these and many other cases where special bits or cutters for special work are employed the above-described means for adjusting the bit-carrier to secure tongues of different thickness and grooves of different widths, as also the means for adjusting the bits toward the depth to which they shall cut, are employed with great advantage.

It will be readily understood that the particular shape of the cutting edges of the bits will in all cases be varied to suit the particular conformation to be made and that various kinds of bits and cutters may be used interchangeably on the same head, my invention relating to this feature.

Having thus described my invention, what I claim as new, and desire to secure by Letters Patent, is—

1. In a matcher-head, the combination with the head proper having cutters arranged to joint defined portions of the vertical edges of the lumber, of a bit-carrying bar seated diametrically of said head, bits carried by the end portions of said bar to operate relatively to the said cutters to impart a special configuration to portions of said vertical edges, said bar being mounted to rock in a vertical plane, and means for securing said bar in the desired adjustment, substantially as specified.

2. In a matcher-head, the combination with jointing-cutters arranged to dress defined positions of the vertical edges of the lumber, of a diametrically-positioned bit-carrying bar seated on the head to rock or tilt in a vertical plane, one or more bits carried by said bar and positioned to operate upon definite portions of the edges of the lumber to form a tongue, groove or rabbet thereon and means for adjusting said bar in the plane of its rocking or tilting movement, substantially as specified.

3. In a matcher-head, the combination with jointing-cutters arranged to dress the plain vertical portions of the edges of the lumber, of a diametrically-positioned bit-carrying bar seated in the head to rock in a vertical plane, one or more bits carried by said bar and positioned to act upon portions of the edges of the lumber, to form the tongue, groove or rabbet, a spring bearing upon one end portion of said bar and having an abutment on the head, and an adjusting device bearing on the opposite end portion of the said bar, substantially as specified.

4. In a matcher-head, the combination with the head proper having jointing blades or cutters arranged to operate to joint the vertical faces of the lumber, of a bit-carrying bar fulcrumed upon said head intermediately of said jointing blades or cutters, and capable of a rocking movement in a vertical plane, a bit or bits carried by said bar and arranged to operate upon the edges of the lumber to form the tongue, groove, or rabbet, and means for adjusting the said bar, substantially as specified.

5. In a matcher-head, the combination with the head proper having jointing blades or cutters arranged to operate to joint the vertical faces of the lumber, of a bit-carrying bar fulcrumed upon said head intermediately of said jointing blades or cutters, and capable of a rocking movement in a vertical plane, a bit or bits carried by said bar and arranged to operate upon the edges of the lumber, to form the tongue, groove, or rabbet, and means for adjusting the said bar, consisting of a spring bearing upon one end portion of said carrier and having an abutment on the head, and a screw-operated device bearing upon the opposite end portion of said bar, substantially as specified.

6. In a matcher-head, the combination with the head proper having jointing blades or cutters arranged to operate upon the edge portion of the lumber, to joint the vertical faces thereof, of a bit-carrier fulcrumed upon the intermediate portion of the head to rock in a vertical plane, a bit or bits mounted on said carrier to operate to form the tongue, groove or rabbet portions of said edges, a spring bearing upon one end portion of said bar, a collar or flange on the head above the bar forming an abutment for said spring, and a screw-threaded adjusting device arranged to bear upon the opposite end portion of said carrier, substantially as specified.

7. The combination with a matcher-head having jointing blades or cutters positioned thereon to joint the vertical portions of the matched face of the lumber, of a bit-carrying bar seated diametrically on said head intermediately of the jointing blades or cutters to rock in a vertical plane, one or more bits mounted on said carrier to form the tongue, groove or rabbet on the edges of the lumber, a collar on the head above said carrier having opposite projecting lugs, one of which bears on said carrier, a spring interposed between the other lug and the opposite end portion of the carrier, and a nut for adjusting said collar, substantially as specified.

8. The combination with a winged matcher-head, having a jointing blade or cutter secured to each of its wings to operate upon the upper and lower edge portions of the lumber a bit-carrier having opposite fulcrum-bearings upon said head to rock in a vertical plane and having as many wings as the head, one or more bits seated upon the wings of said carrier and positioned to operate upon the intermediate portions of said edges, and means for adjusting said bar, substantially as specified.

9. In a matcher-head, the combination with the head proper having straight-edged cutter-blades arranged to joint defined portions of the vertical edges of the lumber, said blades being inclined to the axis of said head and also raised at their rear portions, of a bit-carrying bar seated diametrically of said head, bits mounted on said bar relatively to the said cutters to impart a special configuration to portions of said vertical edges, and means for adjusting the said bar to vary the degree of separation of the planes of the cutting edges of the said bits.

10. The combination with a winged matcher-head having a straight-edged flat jointing cutter-blade secured to each of its wings obliquely to the axis of the head to operate upon the upper and lower edge portions of the lumber, said cutter-blades having their rear portions raised to pitch their upper corner portions forwardly, of a circular cutting-bit seated on said head intermediate each one or more of adjacent blades, two of said bits being arranged to operate upon one side of the tongue or groove, and the other bit or bits upon the other side, substantially as specified.

11. The combination with a winged matcher-head having a straight-edged flat jointing cutter-blade secured to each of its wings obliquely to the axis of the head to operate upon the upper and lower edge portions of the lumber, said cutter-blades having their rear portions raised to pitch their upper corner portions forwardly, of a circular cutting-bit seated on said head intermediate each two adjacent blades, one or more of said bits being arranged to operate upon one side of the tongue or groove, and the other or others upon other side, together with means for adjusting one or more of said bits to bring its cutting edge to a higher or lower plane, substantially as specified.

12. The combination with a winged matcher-head having a straight-edged flat jointing cutter-blade secured to each of its wings to operate upon the upper and lower edge portions of the lumber, said cutter-blades being inclined toward the axis of the head and having their rear portions raised to pitch their upper corner portions forwardly, of a circular cutting-bit seated on said head intermediate each one or more adjacent blades, two of said bits being arranged to operate upon one side of the tongue or groove, and the remaining bit or bits upon other side, together with means for adjusting one or more of said bits to bring its cutting edge to a higher or lower plane, and means for retracting or advancing the cutting edges of said bits with respect to the axis of the head, substantially as specified.

13. In a matcher-head the combination with the head proper having jointing blades or cutters arranged to joint the vertical faces of the lumber, of cutting-bits mounted upon intermediate portions of said head to operate upon the said edges to form the tongue, groove or rabbet, means for adjusting said bits to raise or depress their cutting edges, and means for retracting or advancing said edges with respect to the axis of the head, substantially as specified.

14. In a matcher-head, the bit-carrier bar, and means whereby the same may be adjusted to raise one end portion thereof and depress the opposite end portion, cutting-bits secured to the end portions of the said bar and eccentric devices in connection with said bits whereby their cutting edges may be retracted or advanced with respect to the axis of said head, substantially as specified.

In testimony whereof I affix my signature in presence of two witnesses.

WARREN W. PHILBRICK.

Witnesses:
　MORRIS B. SACHS,
　WINFIELD R. SMITH.